(12) United States Patent
Gringauze et al.

(10) Patent No.: US 8,930,913 B2
(45) Date of Patent: Jan. 6, 2015

(54) INTERMEDIATE REPRESENTATION CONSTRUCTION FOR STATIC ANALYSIS

(75) Inventors: Anna Gringauze, Redmond, WA (US); Henning Korsholm Rohde, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1072 days.

(21) Appl. No.: 12/892,869

(22) Filed: Sep. 28, 2010

(65) Prior Publication Data

US 2012/0079468 A1    Mar. 29, 2012

(51) Int. Cl.
    G06F 9/44     (2006.01)
    G06F 9/45     (2006.01)
    G06F 11/36    (2006.01)

(52) U.S. Cl.
    CPC ............ *G06F 11/3608* (2013.01); *G06F 8/443* (2013.01)
    USPC ............................. 717/126; 717/118; 717/146

(58) Field of Classification Search
    USPC ........................................................ 717/126
    See application file for complete search history.

(56) References Cited

U.S. PATENT DOCUMENTS

| 5,280,617 | A  |   | 1/1994  | Brender et al.       |         |
|-----------|----|---|---------|----------------------|---------|
| 5,355,494 | A  | * | 10/1994 | Sistare et al.       | 717/154 |
| 6,289,506 | B1 |   | 9/2001  | Kwong et al.         |         |
| 6,820,256 | B2 | * | 11/2004 | Fleehart et al.      | 717/155 |
| 6,823,507 | B1 | * | 11/2004 | Srinivasan et al.    | 717/152 |
| 7,076,772 | B2 | * | 7/2006  | Zatloukal            | 717/147 |
| 7,490,320 | B2 |   | 2/2009  | Kielstra et al.      |         |
| 7,530,059 | B2 |   | 5/2009  | Kielstra et al.      |         |
| 2004/0040017 | A1 | * | 2/2004 | Kershenbaum et al.  | 717/158 |
| 2005/0055681 | A1 | * | 3/2005 | Gadre                | 717/146 |
| 2005/0071827 | A1 | * | 3/2005 | Lai                  | 717/146 |
| 2008/0115119 | A1 |   | 5/2008 | Lagergren            |         |
| 2008/0216061 | A1 | * | 9/2008 | Allen                | 717/142 |
| 2010/0115501 | A1 |   | 5/2010 | Partridge et al.     |         |
| 2010/0169870 | A1 |   | 7/2010 | Dice                 |         |

FOREIGN PATENT DOCUMENTS

| CN | 1818863 | 8/2006 |
| CN | 1834922 | 9/2006 |

OTHER PUBLICATIONS

Syme, "ILX: Extending the .NET Common IL for Functional Language Interoperability" 2001, Elsevier Science, Electronic Notes in Theoretical Computer Science 59 No. 1, Accessed online on Sep. 10, 2013 at <http://research.microsoft.com/en-us/um/people/nick/entcs/syme.pdf>.*

(Continued)

*Primary Examiner* — James D Rutten
(74) *Attorney, Agent, or Firm* — Ben Tabor; Brian Haslam; Micky Minhas (57) ABSTRACT

The analysis of an intermediate representation of source or program code. An initial version of an initial representation of the source or program code is accessed and statically analyzed. For one or more portions of this initial version, the analysis component queries an analysis-time resolution component that provides supplemental intermediate representations corresponding to the portion. This supplemental intermediate representation provides further clarity regarding the portion, and is analyzed. If defects are found, they may be reported.

18 Claims, 4 Drawing Sheets

(56) References Cited

OTHER PUBLICATIONS

Andrew Kennedy and Don Syme. 2001. Design and implementation of generics for the .NET Common language runtime. In Proceedings of the ACM SIGPLAN 2001 conference on Programming language design and implementation (PLDI '01). ACM, New York, NY, USA, 1-12. DOI=10.1145/378795.378797 http://doi.acm.org/10.1145/378795.378797.*

Piotr Lesnicki et al., Split Compilation: an Application to Just-in-Time Vectorization, Pub. Date: Sep. 16, 2007 (7 pages).

Michel Cierniak, The Open Runtime Platform: A Flexible High-Performance Managed Runtime Environment, Pub. Date: Feb. 19, 2003 (16 pages).

"First Office Action Received in China Patent Application No. 201110306939.7", Mailed Date: Oct. 25, 2013, Filed Date: Sep. 27, 2011, 11 Pages. (MS# 330425.02).

* cited by examiner

INTERMEDIATE REPRESENTATION CONSTRUCTION FOR STATIC ANALYSIS

BACKGROUND

In order to generate high quality software programs, it is important to test and analyze the functionality of the software program. Dynamic analysis involves actually running the program on well-chosen examples to verify actual behavior of the program. However, it is not always practical to perform dynamic analysis, especially when the individualities of the environment in which the program will be run are not known or are varied. Dynamic analysis is further performed only when the program is completed (possibly using stub classes and functions) and capable of being run.

Static analysis inspects the source or program code without running it. Path sensitive dataflow analysis attempts to exhaustively and precisely predict every path over an abstract domain. This is highly useful for diagnosing problems such as security or localizability problems. In such path sensitive dataflow analysis, a component called a "client" may collect data defined specifically for a problem that the client is suited to detect. The client is given a program in an intermediate representation, which consists of program statements and control flow edges. The client then computes outgoing state for every statement given incoming state.

However, the intermediate representation for some functions can be missing, too complex, or generic, causing the client to make more or less accurate assumptions, which can lead to the detection of false defects ("noise") as well as non-detection of real defects.

Sometimes, only a part of the whole program is analyzed at a time, to make analysis scalable. In this case, missing external components can cause the tools to over-approximate the possible program behavior, leading them to find false defects ("noise), or miss real defects. For example, setting and getting a property of an externally defined class can cause noise when the tool thinks a value of a property could be different from the one which was set on the same defect path before.

Heavily used external components with well-known behavior, such as .Net or STL data structures, usually have code that is too complex or too large to be fully included in the analysis. However, they cause a significant amount of noise (or non-detection of real defects) if the analysis approximates them away completely by, for example, assuming anything is possible as a result of calling an external Application Program Interface (API). For example, a C++ STL map is usually implemented as a balanced tree. It can be prohibitively difficulty to induce from the complex mechanics of the various operations that, say, insert("a", 1) followed by retrieve("a") returns 1 (assuming no other code is running concurrently).

Generic functions in .Net form parameterized intermediate representation, in which statements are parameterized by a type. Such intermediate representation usually has generic-related statements, which may have a different meaning depending on the concrete instantiation. For example, creation of an object of parameterized type can mean allocation of a heap object and calling a constructor, for instantiations with reference types, or creating and initializing a stack variable, for instantiations with value types. The tools are forced then into a complicated logic of understanding the meaning of the generics-related statements depending on the concrete instantiation at each call to instantiated generic API.

BRIEF SUMMARY

At least one embodiment described herein relates to the analysis of an intermediate representation of source or program code. In accordance with one embodiment, an initial version of an initial representation of the source or program code is accessed and statically analyzed. For one or more portions of this initial version, the analysis component queries an analysis-time resolution component that provides supplemental intermediate representations corresponding to the portion. This supplemental intermediate representation provides further clarity regarding the portion, and is analyzed. If defects are found, they may be reported.

In accordance with one embodiment, an analysis-time resolution component receives queries from an analysis component that is statically analyzing an intermediate representation of a program. The analysis-time resolution component accesses information regarding the program that is used to generate a supplemental intermediate representation of the program that may more easily used to analyze the operation of the program.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the analysis of an intermediate representation of source or program code is described. An initial version of an initial representation of the source or program code is accessed and statically analyzed. For one or more portions of this initial version, the analysis component queries an analysis-time resolution component that provides supplemental intermediate representations corresponding to the portion. This supplemental intermediate representation provides further clarity regarding the portion, and is analyzed. If defects are found, they may be reported. First, some introductory discussion regarding computing systems will be described with respect to FIG. 1. Then, the embodiments of the static analysis will be described with respect to FIGS. 2 through 4.

Figure 1:
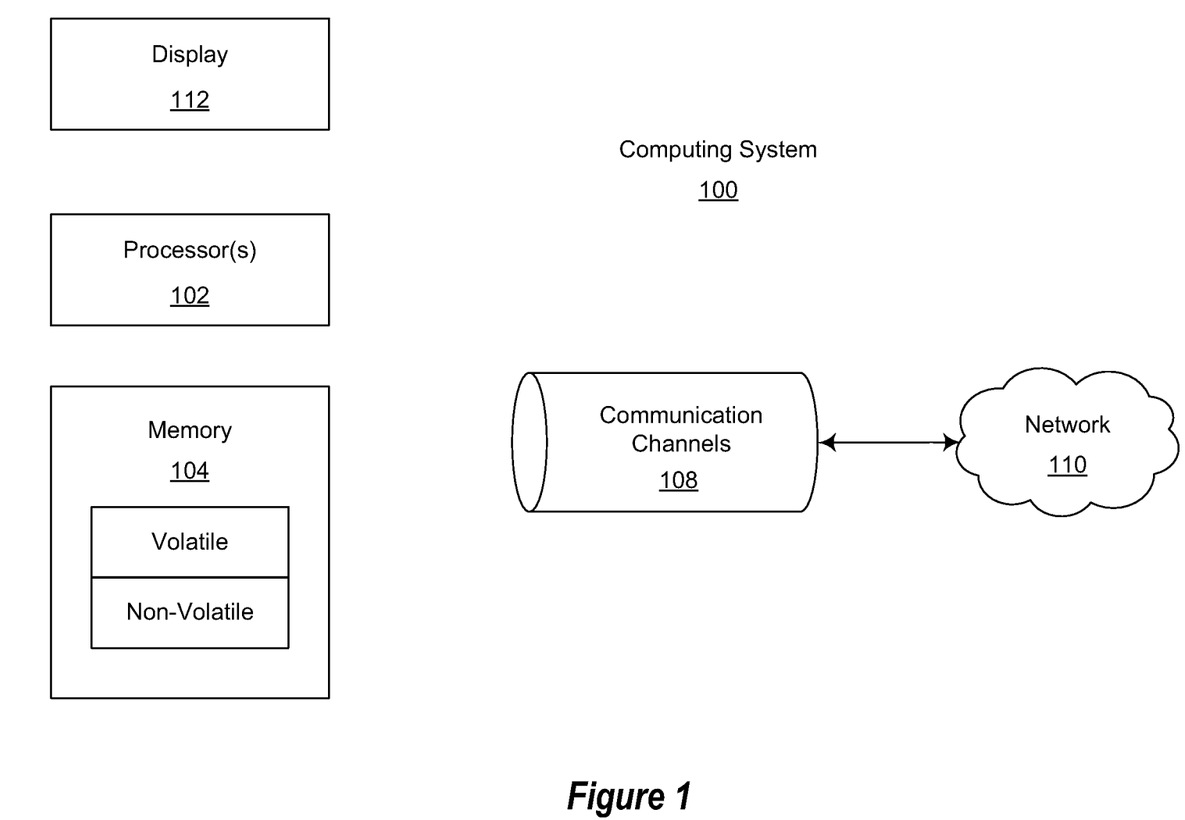
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 may also include a display 112 for displaying a user interface to a user.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
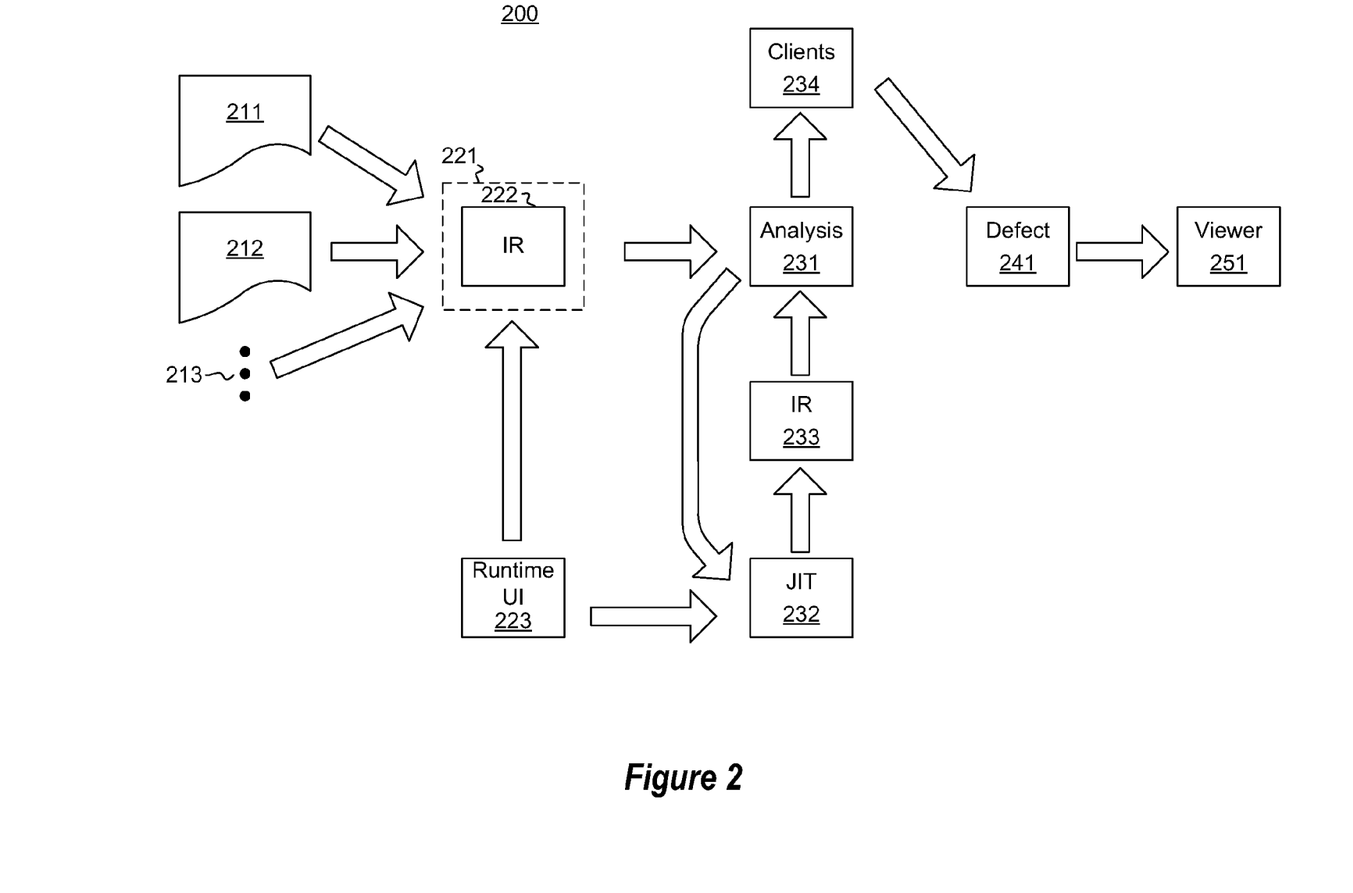
FIG. 2 illustrates an environment in which code is statically analyzed using an intermediate representation and in which an analysis-time resolution component is queried for supplemental intermediate representation.
Figure 3:
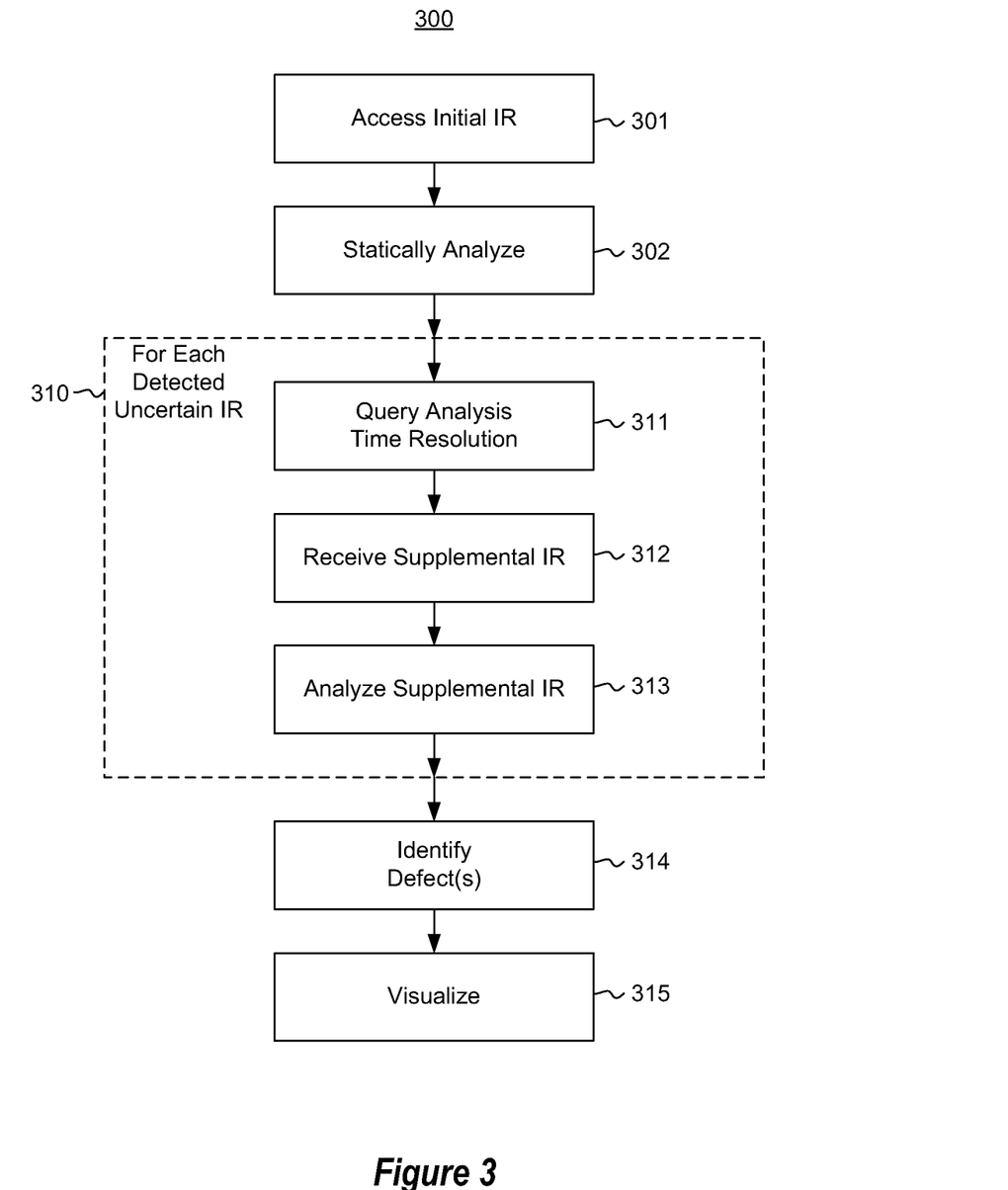
FIG. 3 illustrates a flowchart of a method for statically analyzing intermediate representations of source or program code.

FIG. 2 illustrates an environment 200 that represents an example environment in which the principles described herein may be employed. All or portions of the environment 200 may be implemented on the computing system 100 of FIG. 1 or distributed across multiple of such computing systems. FIG. 3 illustrates a flowchart of a method 300 for statically analyzing intermediate representations of source code. The methodology of FIG. 3 will now be described with frequent reference to the environment 200 of FIG. 2.

In accordance with the method 300 of FIG. 3, an initial version of an intermediate representation of source code is accessed (act 301). At some point the initial representation was generated from the source code. While this generation of the intermediate representation may be performed by the same computing system that statically analyzes the intermediate representation, this is not necessary. Nevertheless, FIG. 2 illustrates that the intermediate representation 222 is at some point generated using source code. For instance, the intermediate representation 222 may be generated by module 221 using any one of a number of different languages of source code. For instance, the source code 211 may represent the program written in the C# programming language, while the source code 212 may represent the program written in the C++ programming language. The vertical ellipses 213 symbolically represents that the intermediate representation 222 may be generated from source code in any language. As an example, the intermediate representation 222 may consist of primitive instructions (not necessarily program statements in the source code sense), and control flow edges for the program.

The initial version of the intermediate representation is then statically analyzed (act 302). For instance, in FIG. 2, an analysis component 231 statically analyzes the intermediate representation. In the illustrated embodiment, one or more clients 234 perform the actual detection by evaluating the intermediate representation. Each client may be specifically designed and structured to detect a particular subset of one or more specific defects.

As the analysis component statically analyzes the intermediate representation, the analysis component may encounter certain portions for which it is difficult to infer, based on the intermediate representation alone, the operations that are occurring. Rather than make assumptions as this stage, the analysis component queries an analysis-time resolution component to help resolve the ambiguity. For instance, in FIG. 2, the analysis component 231 queries the just-in-time component 232 (also referred to as the analysis-time resolution component 232) each time an unknown portion of the intermediate representation is encountered. In this sense, the portion is unknown to the analysis client(s) 234. Examples of unknown code might be code that makes it unclear which code will be executed at runtime.

The acts performed by the analysis component in order to gain greater certainty are illustrated in FIG. 3 as being contained by the box 310. Specifically, the analysis component queries the analysis-time resolution component for clarification of the unclear portion of the intermediate representation (act 311). In response, the analysis component 231 receives supplemental intermediate representation 233 from the analysis-time resolution component 232 (act 312). The supplemental representation may be analyzed (act 313) in conjunction with the initial version of the intermediate representation to gain more clarity.

As an example of an unclear portion of the intermediate representation, suppose that the source code specifies a method of a generic class that is parameterized by type. In that case, unless the type is known, the specific function cannot even be truly identified since the very nature of the function can change depending on the type that is provided as a parameter to the generic class instance. In this case, when the analysis component 231 queries the analysis-time resolution component, the unclear portion of the intermediate representation may be provided. Given knowledge of a generic method or a method of the generic class and the type to instantiate it with, the analysis-time resolution component may provide an intermediate representation of a specific instantiation of the method. In that case, the supplemental intermediate representation 233 is of a specific instantiation of the method.

As another example of a case in which the intermediate representation is unclear, suppose the program makes a function call to an external function that the analysis component 231 knows little or nothing about. In that case, the analysis-time resolution component 233 may understand that in this context, usually a specific function is called. Examples of this are provided below in which the external function Stream::Dispose( ) is called, and also in which the Stream::Dispose( ) function is generated. Based on knowledge of the specific function, the analysis-time resolution component 233 may then generate supplemental intermediate representation representing the specific external function. It is possible that the specific external function calls yet another function. That other function may be already represented by the intermediate representation, in which case, a further function query to the analysis-time resolution component 233 may not be necessary. Otherwise, a query may be made, and the process can be repeated recursively.

A C# code example will now be provided. The source code may include the following class definitions for a class called ReferenceTypeExample, and a class called ValueTypeExample:

```
using System;
// Reference type
class ReferenceTypeExample
{
    public int x;
    // Default constructor
    public ReferenceTypeExample( )
    {
        x = 0;
    }
}
// value type
struct ValueTypeExample
{
    public int x;
    // Default constructor is implicit
}
```

The source code also includes a generic function as follows:

```
class GenericExample
{
    /// <summary>
    /// Generic function, parameterized by type T
    /// which is required to have a default constructor
    /// T can be a value type or a reference type
    /// </summary>
    private T GenericFunction<T>( ) where T : new( )
    {
        T ret = new T( );
        return ret;
    }
}
```

Now suppose that there are two functions that call the general function called GenericFunction. The following function is called TestReferenceTypeInstantiation and calls the function GenericFunction instantiated with the ReferenceTypeExample class:

```
/// <summary>
/// Function calling GenericFunction instantiated with a reference type
/// </summary>
public void TestReferenceTypeInstantiation( )
{
    ReferenceTypeExample t =
```

```
    GenericFunction<ReferenceTypeExample>( );
}
```

The following function is called TestValueTypeInstantiation and calls the function GenericFunction, but instantiated with the ValueTypeExample class:

```
/// <summary>
/// Function calling GenericFunction instantiated with a value type
/// </summary>
public void TestValueTypeInstantiation( )
{
    ValueTypeExample t = GenericFunction<ValueTypeExample>( );
}
```

Based on this source code, the following MSIL intermediate representation may be generated for GenericFunction:

```
//
// MSIL for GenericFunction<T>
//
/*
.method private hidebysig instance !!T GenericFunction<.ctor T>( ) cil managed
{
    // Code size 40 (0x28)
    .maxstack 2
    .locals init ([0] !!T 'ret',
        [1] !!T CS$1$0000,
        [2] !!T CS$0$0001)
    IL_0000: nop
    IL_0001: ldloca.s    CS$0$0001
    IL_0003: initobj     !!T
    IL_0009: ldloc.2
    IL_000a: box         !!T
    IL_000f: brfalse.s   IL_001c
    IL_0011: ldloca.s    CS$0$0001
    IL_0013: initobj     !!T
    IL_0019: ldloc.2
    IL_001a: br.s        IL_0021
    IL_001c: call        !!0
    [mscorlib]System.Activator::CreateInstance<!!0>( )
    IL_0021: stloc.0
    IL_0022: ldloc.0
    IL_0023: stloc.1
    IL_0024: br.s        IL_0026
    IL_0026: ldloc.1
    IL_0027: ret
} // end of method GenericExample::GenericFunction
*/
```

Note in this example, there is a line that calls the CLR runtime function "System.Activator::CreateInstance<!!>( ). In this example, the function is special, in the sense that the function body does not exist and/or cannot be expressed at the C# source code level. Examples of such functions include C/C++ intrinsics as memset/memcpy and some CLR runtime functions. An example of this same generic function in Anvil IR (which is built from the MSIL shown above) is as follows:

```
//
// Generic Anvil IR for GenericFunction<T>
//
// INITOBJECT, BOX, and call to
[mscorlib]System.Activator::CreateInstance`1<!T>
// have a different semantics depending on whether instantiated with a
reference or value types
// The instantiated IR below (generated on the fly by the JIT module)
translates those instructions
// into common instructions matching the corresponding semantics.
// The BRANCH instruction is a test detecting whether the type T is a
reference or a value type.
/*
    FUNCTION [test]GenericExample::GenericFunction`1<T> (size: 20)
        return = ENTER this
            ret =?DECLARE
            t327 = ASSIGN &CS$0$0001
           *t327 = INITOBJECT <!T> $L3(EH)
            t285 = BOX <!T> CS$0$0001 $L3(EH)
            t294 =?NE t285 0
                = BRANCH t294 true:$L11 false:$L16
    $L11    = LABEL (references: 1)
            t328 = ASSIGN &CS$0$0001
           *t328 = INITOBJECT <!T> $L3(EH)
            t288- =? ASSIGN CS$0$0001
                = GOTO $L23
    $L16    = LABEL (references: 1)
            t288- = CALL
            [mscorlib]System.Activator::CreateInstance`1<!T> $L3(EH)
    $L23    = LABEL (references: 1)
            ret = ASSIGN t288-
            t293 = ASSIGN ret
        return = RETURN t293
    $L2     = EXIT (references: 0)
    $L3     = UNWIND (references: 4)
*/
```

Here, the line System.Activator::CreateInstance`1<!T> $L3(EH) is a specific function that is introduced by the runtime. The intermediate language may be replaced with the following different intermediate representation:

```
//
// Jitted Anvil IR for GenericFunction<ReferenceTypeExample>
//    as generated by JIT at the callsite for GenericFunction in function
TestReferenceTypeInstantiation
//
// In reference type case, INITOBJECT just initializes the pointer to null,
// BOX reduces to a simple assignment, and CreateInstance translates into
a NEWOBJ instruction
// (memory allocation) and a call to the default constructor.
// Note that the BRANCH instruction is still there, but its true branch will
never be taken,
// which is easily detected by the analysis engine.
/*
    FUNCTION
    [test]GenericExample::GenericFunction`1<mref(class
    [test]ReferenceTypeExample)> (size: 17)
        return =?ENTER this
            ret =?DECLARE
            t285 = ASSIGN null
            t294 =?NE t285 0
                = BRANCH t294 true:$L11 false:$L16
    $L11    = LABEL (references: 1)
            t288- = ASSIGN null
                = GOTO $L23
    $L16    = LABEL (references: 1)
            t288- = NEWOBJECT <class
            [test]ReferenceTypeExample> $L3(EH)
                = CALL [test]ReferenceTypeExample::.ctor t288-
                    $L3(EH)
    $L23    = LABEL (references: 1)
            ret = ASSIGN t288-
            t293 = ASSIGN ret
        return = RETURN t293
    $L2     =?EXIT (references: 0)
    $L3     =?UNWIND (references: 2)
*/
```

As another example, following intermediate representation may represent a specific instance of the GenericFunction instantiated with ValueTypeExample:

```
//
// Jitted Anvil IR for GenericFunction<ValueTypeExample>
// as generated by JIT at the callsite for GenericFunction in function
TestReferenceTypeInstantiation
//
// INITOBJECT translates to the call to the implicit default constructor (which body is
also generated by the JIT),
// BOX has the usual BOX semantics of creating a wrapper object,
// and CreateInstance reduces to a simple assignment.
// Note that the BRANCH instruction is still there, but its false branch will never be
taken,
// which is easily detected by the analysis engine.
//
/*
          FUNCTION      [test] GenericExample::GenericFunction`1<struct
[test]ValueTypeExample> (size: 17)
                return =?ENTER this
                       ret =?DECLARE
                         t327 = ASSIGN &CS$0$0001
                                = CALL [test]ValueTypeExample::$CTOR t327 $L3(EH)
                             t285 = BOX <struct [test]ValueTypeExample> CS$0$0001 $L3(EH)
                         t294 =?NE t285 0
                                = BRANCH t294 true:$L11 false:$L23
     $L11        = LABEL (references: 1)
                         t328 = ASSIGN &CS$0$0001
                                = CALL [test]ValueTypeExample::$CTOR t328 $L3(EH)
                       t288- =? ASSIGN CS$0$0001
     $L23        = LABEL (references: 1)
                       ret = ASSIGN t288-
                         t293 = ASSIGN ret
return = RETURN t293
     $L2         =?EXIT (references: 0)
     $L3         =?UNWIND (references: 3)
*/
```

Both of the latter functions represent intermediate representations of different specific instantiations of the GenericFunction class.

As another example, the function may be a generic instantiation but there is no access to the generic version, or the function is not generic, but the body of the function cannot be accessed. In this case, pre-generated intermediate representation (sometimes approximately) models the well-known library functions. This includes the example of .Net Stream class in which the Dispose( ) function calls Close( ) which in turn calls the virtual function Dispose(bool). But the call to the Dispose(bool) function is not visible to the analysis if we only have the intermediate representation for a class derived from the stream. If the described behavior of .Net Stream class is unknown to the analysis, the following code seems to not dispose of the derived stream properly:

```
public static void Test01( )
{
    using(var s = new MyStream( ))
    {
    }
    // inner the stream is disposed properly here, since there is an implicit
call to Stream::Dispose( ), which calls Stream::Close( ), which calls
MyStream::Dispose(bool), which disposes of the inner resources.
}
```

To the client that is oblivious of the Stream implementation, the MyStream object seems not to be disposed of properly because the "using" clause will translate into the following code, where Stream::Dispose( ) is called in the final section instead of MyStream::Dispose(bool), which would dispose of the MyStream object properly:

```
public static void Test01( )
{
    var s = new MyStream( )
    try
    {
    }
    Finally
    {
        s.Dispose( ); // inner the stream is disposed properly here, since
there is an implicit call to Stream::Dispose( ), which calls
Stream::Close( ), which calls MyStream::Dispose(bool), which disposes of
the inner resources.
    }
}
```

The following code shows an example of MyStream class implementation used in the example above.

```
public class C : IDisposable
{
    public void Dispose( )
    {
    }
} public class MyStream : Stream
{
    C res = new C( );
    public override bool CanRead { get { return true; } }
    public override bool CanSeek { get { return true; } }
    public override bool CanWrite { get { return true; } }
    public override long Length { get { return 0; } }
    public override long Position { get { return 0; } set { } }
    public override void Flush( ) { }
    public override void SetLength(long l) { }
    public override int Read(byte[ ] bytes, int a, int b) { return 0; }
    public override void Write(byte[ ] bytes, int a, int b) { }
    public override long Seek(long a, System.IO.SeekOrigin o) { return
0; }
```

-continued

```
    protected override void Dispose(bool disposed)
    {
        res.Dispose( );
    }
}
```

In this case, the following library function may assist in the generation of intermediate representations that provide the specific function. The generated code for the Stream class is shown in the following runtime.cs example.

```
using System;
using System.Text;
namespace System
{
    namespace IO
    {
        /// <summary>
        /// Stream runtime model
        /// </summary>
        public abstract class Stream : MarshalByRefObject, IDisposable
        {
            /// <summary>
            /// Close
            /// </summary>
            public virtual void Close( )
            {
                Dispose(true);
                // GC.SuppressFinalize(this);
            }
            /// <summary>
            /// Dispose
            /// </summary>
            void IDisposable.Dispose( )
            {
                Close( );
            }
            /// <summary>
            /// Dispose
            /// </summary>
            public virtual void Dispose(bool disposing)
            {
                //
            }
        }
    }
}
```

Returning to FIG. 3, throughout the static analysis, the clients 234 generate a list of identified defects (act 314). Potentially, the static analysis also yields corresponding intermediate representation portions giving rise to the defects. The defects (and potentially the corresponding intermediate representation) may then be visualized to a user (act 315). For instance, the defects report may be visualized on display 112.

Optionally, a runtime user interface 223 is also provided, which may perhaps also be displayed using display 112. The user interface 223 allows a user to provide information to the analysis-time resolution component 232 that the analysis-time resolution component 232 may use to generate a supplemental intermediate representation for one or more of the at least one portion of the initial version of the intermediate representation. As an example, the information may include generic implementations of methods, so that the analysis-time resolution component 232 can instantiate them. This information may be provided using the display 112 or perhaps via files. For instance, the information may include generic implementations of methods, to that the analysis-time resolution component 232 can instantiate them.

Figure 4:
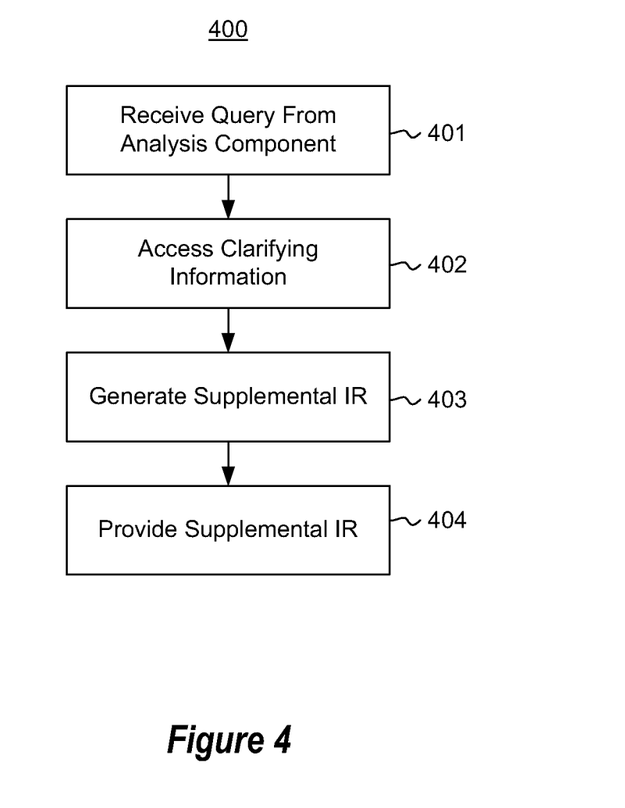
FIG. 4 illustrates a flowchart of a method for the analysis-time resolution component to support a static analysis of source or program code by generating supplemental intermediate representation.

FIG. 4 illustrates a flowchart of a method 400 for the analysis-time resolution component to support a static analysis of source code by generating supplemental intermediate representation. The analysis-time resolution component 232 receives a query from the analysis component 231 (act 401). As mentioned with respect to FIG. 3, this query may be generated perhaps when an unclear segment of the intermediate representation is encountered, as when perhaps a generic class or method or external function call is encountered.

In response to the query, the analysis-time resolution component accesses information that clarifies a process associated with the unclear portion (act 402). Then the analysis-time resolution component generates a supplemental intermediate representation that corresponds to the portion using the accessed information (act 403). The supplemental intermediate representation is then provided to the analysis component (act 404).

Accordingly, the principles described herein permit for more complete and accurate static analysis of intermediate representations of source code without negatively impacting the development cost of the clients that use the intermediate representation to find defects. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-storage media having thereon computer-executable instructions that, when executed by one or more processors of the computing system, cause the computing system to perform the following:
    an act of accessing an initial version of an intermediate representation of source or program code;
    an act of statically analyzing the initial version of the intermediate representation to identify defects in the source or program code;
    determining, by the statically analyzing, for at least one portion of the initial version of the intermediate representation, that the effect of the at least one portion is uncertain and that it cannot be inferred by the static analysis which operations occur in the at least one portion wherein one or more of the at least one portion of the initial version of the intermediate representation is a function call to an external runtime component;
    for the at least one portion of the initial version of the intermediate representation for which the effect of the portion is uncertain and that it cannot be inferred which operations occur, performing the following:
        an act of querying an analysis-time resolution component for clarification of the at least one portion of the intermediate representation; and
        an act of receiving supplemental intermediate representation in response to the query; and
        an act of analyzing the supplemental representation for identification of defects.

2. The computer program product in accordance with claim 1, wherein one or more of the at least one portion of the initial version of the intermediate representation is a generic method or a method in a generic class parameterized by one or more types.

3. The computer program product in accordance with claim 2, wherein the supplemental intermediate representation is of a specific instantiation of the generic class.

4. The computer program product in accordance with claim 1, wherein the supplemental intermediate representation is of an operation of the external component.

5. The computer program product in accordance with claim 1, wherein the act of accessing an initial version of an intermediate representation of source or program code comprises:
an act of accessing the source or program code; and
an act of generating the initial version of the intermediate representation of the source or program code using the accessed source or program code.

6. The computer program product in accordance with claim 5, wherein the act of accessing the source or program code, and generating the initial version of the intermediate representation may be performed for multiple different languages of source or program code.

7. The computer program product in accordance with claim 1, wherein the act of statically analyzing the initial version of the intermediate representation comprises:
an act of a plurality of defect detection components evaluating the initial version of the intermediate representation, each of the plurality of defect detection components designed to detect a subset of one or more specific defects.

8. The computer program product in accordance with claim 1, wherein the computer-readable media are further structured such that, when executed by the one or more processors, the computing system is further caused to perform the following:
an act of generating a list of identified defects resulting from the act of analyzing.

9. The computer program product in accordance with claim 8, wherein the computer-readable media are further structured such that, when executed by the one or more processors, the computing system is further caused to perform the following:
an act of displaying the defect list.

10. The computer program product in accordance with claim 1, wherein the computer-readable media are further structured such that, when executed by the one or more processors, the computing system is further caused to perform the following:
an act of providing a user interface through which the user may provide information to the analysis-time resolution component that the analysis-time resolution component may be used to generate a supplemental intermediate representation for one or more of the at least one portion of the initial version of the intermediate representation.

11. A method for an analysis-time resolution component running on a computing system to support a static analysis of source or program code, the method comprising:
an act of receiving a query from an analysis component that is performing a static analysis of an initial version of an intermediate representation of a source or program code for the identification of defects, the query identifying a portion of the initial version of the intermediate representation which was determined by the static analysis that the effect of the portion is uncertain and that operations which occur in the at least one portion cannot be determined by the static analysis wherein one or more of the at least one portion of the initial version of the intermediate representation is a function call to an external runtime component;
in response to the query, an act of accessing information that clarifies a process associated with the portion;
an act of generating supplemental intermediate representation that corresponds to the portion using the accessed information; and
an act of providing the generated supplemental intermediate representation to the analysis component.

12. The method in accordance with claim 11, wherein the analysis component is also running on the computing system.

13. The method in accordance with claim 11, wherein the portion includes a generic method or a method in a generic class parameterized by one or more types.

14. The method in accordance with claim 13, wherein the supplemental intermediate representation is of a specific instantiation of the generic class.

15. The method in accordance with claim 11, wherein the supplemental intermediate representation is of an operation of the external component.

16. The method in accordance with claim 11, wherein the analysis-time resolution component receives multiple queries from the analysis component, each for a corresponding portion of the initial version of the intermediate representation, and the analysis-time resolution component responds to at least some of the queries with corresponding supplemental intermediate representation.

17. The method in accordance with claim 11, wherein the information accessed is at least partially provided to the analysis through a user interface through which a user may provide information regarding an operation of the program that is represented by the initial version of the intermediate representation.

18. A computer program product comprising one or more computer-storage media having thereon computer-executable instructions that, when executed by one or more processors of the computing system, cause the computing system to perform the following:
an act of accessing an initial version of an intermediate representation of source or program code;
an act of statically analyzing the initial version of the intermediate representation to identify defects in the source or program code;
determining, by the statically analyzing, for a plurality of portions of the initial version of the intermediate representation, that the effect of the plurality of portions is uncertain and that it cannot be inferred by the static analysis which operations occur in the plurality of portions wherein one or more of the plurality of portions of the initial version of the intermediate representation is a function call to an external runtime component;
for each of the plurality of portions of the initial version of the intermediate representation for which the effect of the portion is uncertain and that it cannot be inferred by the static analysis which operations occur in the plurality of portions, the plurality of portions including a first portion, that is a generic method or a method in a generic class parameterized by one or more types, and including a second portion, that is a function call to an external component, performing the following for each of the plurality of portions:
an act of querying an analysis-time resolution component for clarification of the portion of the intermediate representation; and
an act of receiving supplemental intermediate representation in response to the query,
wherein for the first portion the supplemental intermediate representation is of a specific instantiation of the generic class, and
wherein for the second portion the supplemental intermediate representation is of an operation of the external component; and
an act of analyzing the supplemental intermediate representation.

* * * * *